(12) United States Patent
Saegrov

(10) Patent No.: US 7,342,482 B2
(45) Date of Patent: Mar. 11, 2008

(54) COMMUNICATION CONTROLLER FOR AN ACTIVE TRANSPONDER

(75) Inventor: Atle Saegrov, Trondheim (NO)

(73) Assignee: Q-Free Asa, Trondheim (NO)

( * ) Notice: Subject to any disclaimer, the term of this patent is extended or adjusted under 35 U.S.C. 154(b) by 0 days.

(21) Appl. No.: 11/048,717

(22) Filed: Feb. 3, 2005

(65) Prior Publication Data
US 2005/0179522 A1 Aug. 18, 2005

Related U.S. Application Data

(63) Continuation of application No. 10/169,764, filed as application No. PCT/NO01/00014 on Jan. 15, 2001, now abandoned.

(30) Foreign Application Priority Data
Aug. 2, 2000 (NO) .................................. 20000614

(51) Int. Cl.
*H04Q 5/22* (2006.01)
(52) U.S. Cl. ............... 340/10.4; 340/10.34; 340/10.41; 340/10.51; 340/10.52
(58) Field of Classification Search ............... 340/7.32, 340/10.1, 10.34, 10.4, 928, 933, 941; 34/10.4
See application file for complete search history.

(56) References Cited

U.S. PATENT DOCUMENTS

| | | | | |
|---|---|---|---|---|
| 4,303,904 A | * | 12/1981 | Chasek | 235/384 |
| 4,325,146 A | * | 4/1982 | Lennington | 398/108 |
| 5,204,675 A | * | 4/1993 | Sekine | 340/933 |
| 5,621,412 A | * | 4/1997 | Sharpe et al. | 340/10.33 |
| 5,657,008 A | * | 8/1997 | Bantli | 340/933 |
| 5,724,591 A | * | 3/1998 | Hara et al. | 713/322 |
| 6,294,953 B1 | * | 9/2001 | Steeves | 329/341 |
| 6,317,721 B1 | * | 11/2001 | Hurta et al. | 705/13 |

* cited by examiner

*Primary Examiner*—Jeffery Hofsass
*Assistant Examiner*—Scott Au
(74) *Attorney, Agent, or Firm*—Dennison, Schultz & MacDonald

(57) ABSTRACT

A method for processing of encoded information by a battery-powered active transponder is disclosed for the application within a transponder system for the wireless payment of road toll having the steps of receiving modulated microwave radiation of preset frequency by the transponder over the antenna and for obtaining an input signal demodulated for obtaining a binary input data sequence, feeding said binary input data sequence to a digital processor (microcontroller) operated by a processing clock of preset clock frequency for decoding and generating of a binary output data sequence, and forming an output signal from an answer to the received input signal within a certain duration.

3 Claims, 1 Drawing Sheet

COMMUNICATION CONTROLLER FOR AN ACTIVE TRANSPONDER

Figure 1:
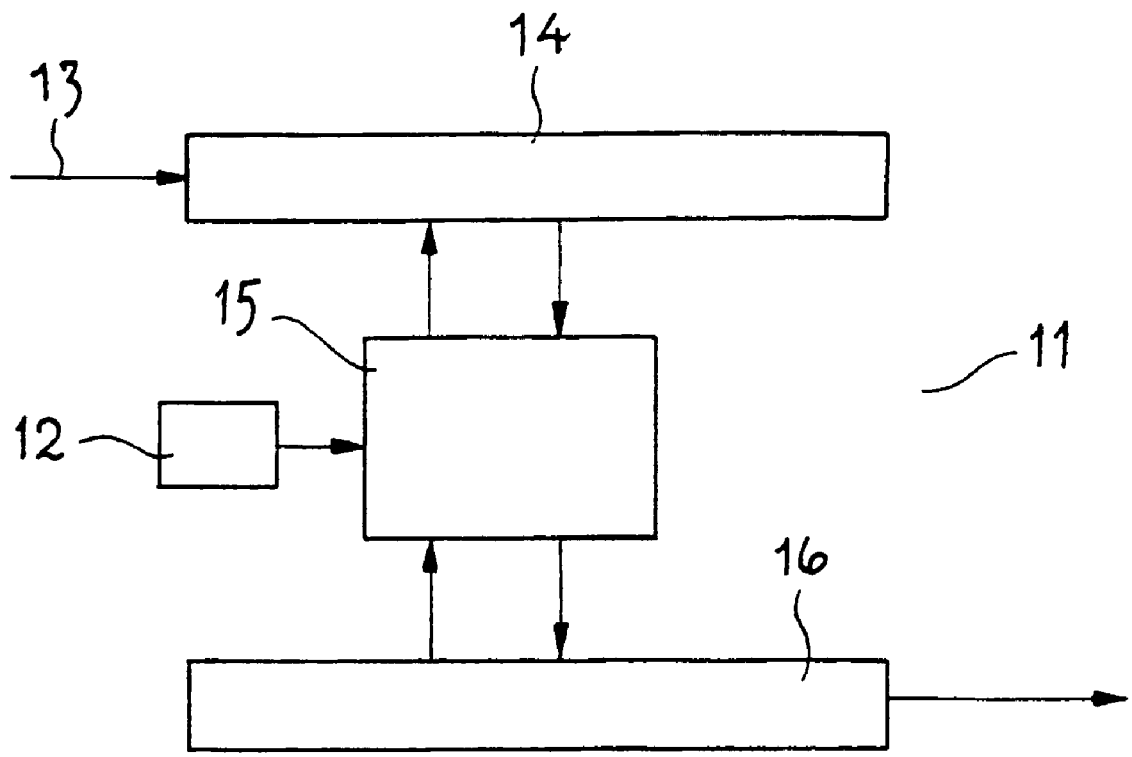

This application is a CON of Ser. No. 10/169,764 Aug. 1, 2002 ABN which is a 371 of PCT/NO01/00014 Jan. 15, 2001.

The invention concerns a method for processing encoded information by a battery-powered transponder, and a communications controller for the transponders.

BACKGROUND OF THE INVENTION

The background of the invention is the wireless payment of charges for the use of roads (road toll) by vehicles. Systems provided for this purpose have been delivered by the Q-Free ASA company since many years. Nowadays these systems are used in Norway and are well known under the term "Q-Free-box". In this connection the term "box" is related to the module of this system attached to an individual vehicle, that is to say to a so-called transponder. This transponder receives data from a main station of the transponder system and as an answer on this transmitts individual data back to the roadside. Meanwhile the technological development in this field has turned to transponders which—contrary to transponders formerly used in this field—are being operated not passive, but active and for the operation of which microwave radiation with frequencies in the range of 5.8 GHz is applied. With this known transponder system the radiation received by the transponder is amplitude modulated for the transmission of data, while the microwave radiation transmitted by the transponder for the transmission of data is phase modulated.

The modulated input signal obtained in the transponder by the reception of the microwave radiation initially is demodulated for obtaining a binary input data sequence (of an input data frame). Then this input data sequence is fed to a digital processor (microcontroller) operated by a processing clock of preset clock frequency for decoding and further processing of the received data as well as for generating of a binary output data sequence (output data frame). During a certain duration from the output data sequence as an answer to the input signal an output signal is formed in the transponder which as modulated microwave radiation of certain frequency is irradiated over the antenna of the microcontroller.

These active transponders are as energy source provided with a battery. In this connection the term "battery" comprises electrical primary cells as well as electrical secondary cells in a single oder in a multiple arrangement.

With the known transponder systems the succeeding transactions (transaction sequencies) between the main station of the transponder system and the individual transponder are carried out on the basis of an advanced communications protocol (HDLC—High Level Data Link Control) and usually contain the processing of data sequencies and control fields. Furthermore there is a considerable need for the security of the transactions which are to be carried out. To the most common security algorithms belong DES (Data Encrypting Standard System) and Trippel-DES. However the application of these security algorithms usually means that with this the processing of data by the transponder becomes very time consuming.

To this day the most common solution for a transponder of the transponder system is a solution, with which a serial processor is applied as microcontroller. With this solution there is available flexibility for changes and it is possible to achieve satisfying transaction speed with the use of processors, which operate with a system clock rate with a clock frequency of 10 MHz and higher.

The greatest problem which consists with microcontrollers applied as communications controllers until now is that there from the relatively high clock frequency of the system clock results a relatively high load for the battery of the transponder, and this in view of the average height and the duration of the current (integral over the current pulses over the time withdrawn with the frequency of the system clock) as well as in view of the fact that the pulse-like occuring current withdrawal represents an exceptional load for the battery. Even if this current withdrawal does not mean so much for the life time of the components of the transponder so a current withdrawal of such an extent and id an especially pulse-like occuring way is problematical particularly at relatively low temperatures where the internal resistance of the battery is high.

Finally the microcontroller applied for the transponder until now is a serially operating processor. This means that such a processor is not ideal in view of the processing of data which can be processed parallel, especially not then when on the one hand processing-wise extensible actions (decoding) are necessary in the processor and on the other hand within a shortest possible duration after receipt of the input signal an output signal shall be emitted from the transponder.

OBJECT

The invention has the aim on the one hand to considerably reduce the mentioned load of the battery for extending its life time and for improving its operability and on the other hand to enable the transponder to emit an output signal onto the received input signal within a relatively short duration.

Invention

For achieving the aforementioned aim the invention according to the claims.

Further advantageous and suitable procedural steps or measures are indicated in the claims.

On the basis of the knowledge that with the transponder system in question the structure of the content of the data sequences received and transmitted by the transponder at least at a considerable amount allows a parallel and particularly bit-by-bit occuring processing, the solution for carrying out procedural steps according the invention indicated in claim 1 compared to the nowadays state-of-the-art offers the advantage of a considerable reduced load of the battery of the transponder by pulse-like occuring current withdrawal together with a relatively short duration until irradiation of an answer onto the received input signal.

An advantageous feature of the invention is that with. With a parallel processing of data of the decoded input data sequence carried out correspondingly it is possible to realize this processing with a system clock rate with only a fraction of the clock frequency usual until now and nevertheless compared to the previous solution to considerable shorten the duration between the receiving of the input signal up till the the forming of the output signal. For that only the extent of the processing of data of the input data sequence now occuring has to exceed the extent of the reduction of the clock frequency in its impact onto the mentioned duration. For generating of such a—compared to the state-of-the-art "slower"—processing rate a corresponding oscillator can be applied in the transponder.

Advantageously the procedural step according to claim 3 is applied. This solution is useful in view of the fact, that the symbol clock is that clock within the transponder system, which has the lowest clock frequency, namely a considerably lower clock frequency compared to the previous system clock. The application of a separate oscillator within the transponder for generation of the system clock for the processor can be done without. This also has a positive effect on the load of the battery.

By retrieving the symbol clock and the following use of it as system clock an ideal solution for the current withdrawal from the battery is obtained. The symbol clock is that clock with the absolutely lowest clock frequency which can be obtained in the transponder system without introduction of additional buffers or the like. A microcontroller solution which is based on a plurality of processor modules, which are being operated with this system clock, enables bit-by-bit occuring decoding of the data reaching the transponder. This forms a contrast to a microcontroller solution, with which at first the data sequence (the data frame) has to be stored and thereafter the processing of the data can be started.

The invention also provides a preferred solution for forming of a clock frequency derived from the clock frequency of the symbol clock timing generator or corresponding to this clock frequency.

A particularly useful procedure is provided by a processibility of the mentioned data in a more or less parallel occuring mode.

invention also concerns a communications controller or useful design of it as it can be applied with advantage in connection with the method according to the invention.

EXAMPLES

In the following the invention will be described more detailed with the aid of FIG. 1 and 2 of the drawing.

Figure 2:
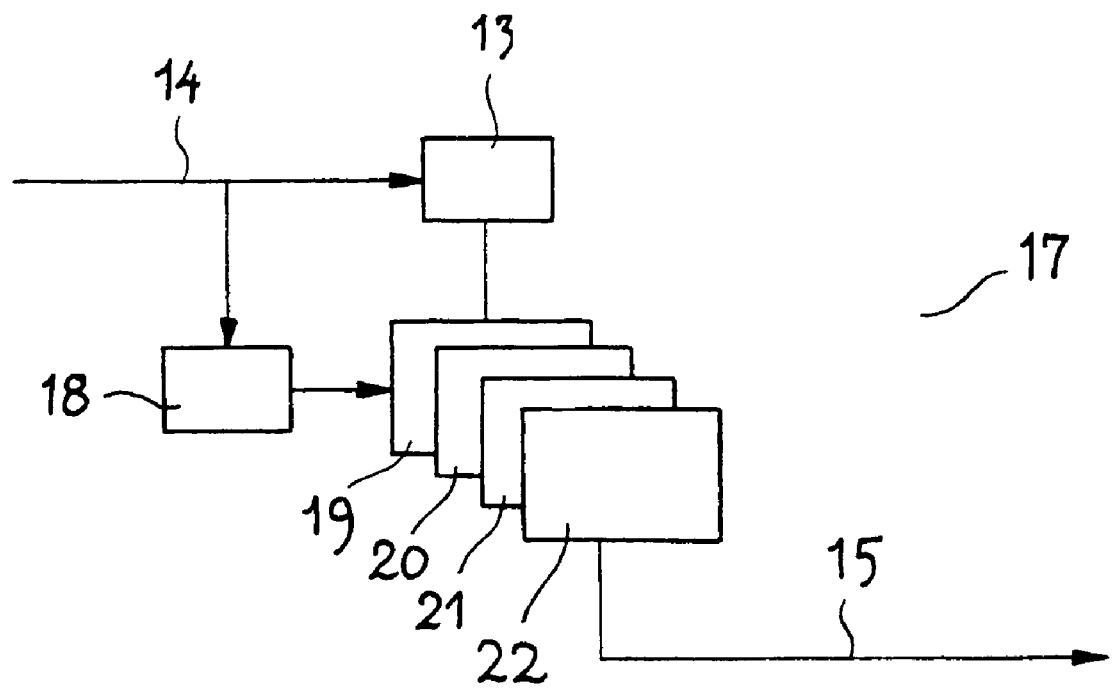

FIG. 1 shows in connection with the invention an essential part of a communications controller of a transponder according to the state-of-the-art and as a block diagram, and FIG. 2 shows essential parts of a communications controller as it is applied in connection with the invention and as a block diagram.

FIG. 1 shows a communication controller 1 of a transponder not shown in further detail according to the state-of-the-art. The system clock for the communications controller 1 is being delivered by an oscillator 12. Over a line 23 incoming input data are being stored in a receiving memory (buffer) 14. When the complete dat sequence (data frame) is being received and stored, the processor core 15 will start the processing of the input data and prepare an answer of the transponder onto the input data. This happens with a system clock with a clock frequency of about 10 MHz or with a still higher clock frequency. After the answer is completed it will be laid down in a transmission buffer 16, and as soon as the transmission buffer 16 is filled with data the transmission of data can be started and the answer can be irradiated over the antenna of the transponder in the form of a phase modulated microwave radiation.

FIG. 2 shows essential parts of a communications controller 17 according to the invention. This communications controller 17 is based on a completely different "architecture" compared to the known communications controller 1 according to FIG. 1. With the communications controller 17 according to FIG. 2 the system clock is delivered from a symbol clock retrieving circuit 18 which the system clock achieved in this way delivers to all processor modules 19-22 integated for a parallel occuring processing of data.

The data decoder indicated with numeral 13 delivers decoded data to the processor modules 19-22, which after each reception of data over the line indicated with numeral 24 will decode these data, process them and form answers. Immediate after the last bit of the received data sequence (data frame) has been decoded the transmission of answering, data over the line indicated with numeral 25 can be started. In this way not only the duration between the reception of the input signal and the irradiation of the output signal of the transponder is considerably shortened, but— because of the considerably reduced clock frequency of the system clock of the transponder—also the load of the battery of the transponder is reduced in a considerable extent.

The invention claimed is:

1. Method for processing of encoded information by a battery-powered active transponder provided for the application within a transponder system for the wireless payment of road toll, comprising:
   receiving modulated microwave radiation of preset frequency by the transponder over the antenna and for obtaining an input signal demodulated for obtaining a binary input data sequence,
   feeding said binary input data sequence to a digital processor (microcontroller) operated by a processing clock of preset clock frequency for decoding and generating of a binary output data sequence,
   forming an output signal from an answer to the received input signal within a certain duration, and transmitting over the antenna of the transponder, characterized in that for reducing the load of the battery of the transponder by the pulse occurring current demand of the processor with at the same time a relative short duration between the receiving of the input signal and the irradiating of the output signal data,
   wherein the processing of data of the decoded input data sequence occurs at a clock frequency of less than about 10 MHz, and
   wherein the processing of data of the decoded input data sequence is realized with a clock frequency which is derived from the clock of the symbol timing generator by retrieving of a plurality of succeeding timing pulses of the symbol clock from the input data sequence and corresponding to the clock frequency of the symbol clock.

2. Method according to claim 1, characterized in that for forming of a clock frequency either derived from the clock frequency of the symbol clock or corresponding to this clock frequency an electronic PLL-circuit (phase locked loop) is applied.

3. Method according to claim 1, characterized in that the processing of data of the decoded input data sequence is realized bit-by-bit.

* * * * *